United States Patent
Reeves et al.

(10) Patent No.: US 12,457,556 B1
(45) Date of Patent: Oct. 28, 2025

(54) REDUCING GREENHOUSE GAS EMISSIONS OF TERRESTRIAL WIRELESS TELECOMMUNICATIONS NETWORKS

(71) Applicant: T-Mobile USA, Inc., Bellevue, WA (US)

(72) Inventors: Raymond E. Reeves, Orlando, FL (US); Simon Youngs, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/930,929

(22) Filed: Oct. 29, 2024

(51) Int. Cl.
*H04W 52/02* (2009.01)
*H04W 16/22* (2009.01)
*H04W 84/06* (2009.01)

(52) U.S. Cl.
CPC ....... *H04W 52/0258* (2013.01); *H04W 16/22* (2013.01); *H04W 84/06* (2013.01)

(58) Field of Classification Search
CPC .. H04W 52/0258; H04W 84/06; H04W 24/02
See application file for complete search history.

(56) References Cited

U.S. PATENT DOCUMENTS

| | | | |
|---|---|---|---|
| 6,701,149 B1 | 3/2004 | Sen et al. | |
| 6,738,624 B1 | 5/2004 | Aksentijevic et al. | |
| 6,862,622 B2 | 3/2005 | Jorgensen | |
| 7,769,382 B2 | 8/2010 | Rasanen | |
| 7,881,196 B2 | 2/2011 | Bader | |
| 7,957,352 B2 | 6/2011 | Vanghi et al. | |
| 8,125,956 B2 | 2/2012 | Reddy et al. | |
| 8,306,537 B2 | 11/2012 | Burbidge et al. | |
| 8,315,634 B2 | 11/2012 | Gustavsson | |
| 8,380,223 B2 | 2/2013 | Pawson et al. | |
| 8,477,811 B2 | 7/2013 | Kitazoe | |
| 8,559,392 B2 | 10/2013 | Puthiyandyil et al. | |
| 8,909,230 B2 | 12/2014 | Kapoor et al. | |
| 9,288,755 B2 * | 3/2016 | Chou | H04L 41/5009 |
| 9,565,626 B2 | 2/2017 | Faccin et al. | |

(Continued)

FOREIGN PATENT DOCUMENTS

| | | |
|---|---|---|
| CN | 101925190 B | 7/2014 |
| EP | 2146540 B1 | 10/2010 |

(Continued)

*Primary Examiner* — Shukri Taha
(74) *Attorney, Agent, or Firm* — Perkins Coie LLP (57) ABSTRACT

Devices, methods, and systems for reducing greenhouse gas emissions of a wireless network are disclosed. In one embodiment, the device can monitor network resource utilization of a RAN cell and predict its future network resource utilization based on at least one factor. The device can determine the future network resource utilization of a non-terrestrial network (NTN). When the network resource utilization of the RAN cell is less than a first threshold and network resource utilization of the NTN is less than a second threshold in the future time period, the device can initiate an energy conservation procedure. The energy conservation procedure can comprise sending an instruction to a first wireless device connected to the RAN cell to transfer a first call or a first data session from the RAN cell to the NTN and sending an instruction to the RAN cell to enter a low power mode of operation.

17 Claims, 5 Drawing Sheets

(56) References Cited

U.S. PATENT DOCUMENTS

| | | |
|---|---|---|
| 9,642,068 B2 | 5/2017 | Chen et al. |
| 9,681,480 B2 | 6/2017 | Adjakple et al. |
| 9,756,533 B2 | 9/2017 | Mestanov et al. |
| 9,794,809 B2 | 10/2017 | Chou et al. |
| 9,826,411 B2 | 11/2017 | Pérez et al. |
| 9,843,687 B2 | 12/2017 | Campbell et al. |
| 9,877,256 B2 | 1/2018 | Sirotkin et al. |
| 9,936,428 B2 * | 4/2018 | Faccin ............... H04W 36/144 |
| 9,942,793 B2 | 4/2018 | Gerasimenko et al. |
| 9,942,841 B2 | 4/2018 | Chou |
| 9,942,904 B2 | 4/2018 | Smith et al. |
| 10,306,697 B2 | 5/2019 | Wang et al. |
| 10,893,468 B2 | 1/2021 | Da Silva et al. |
| 11,606,716 B2 | 3/2023 | Yoon |
| 11,606,726 B2 * | 3/2023 | Sun ..................... H04W 28/10 |
| 2006/0142032 A1 | 6/2006 | Derakhshan et al. |
| 2006/0264217 A1 | 11/2006 | Shaheen |
| 2006/0276190 A1 | 12/2006 | Shaheen |
| 2007/0202891 A1 | 8/2007 | Diachina et al. |
| 2007/0213059 A1 | 9/2007 | Shaheen |
| 2010/0029282 A1 | 2/2010 | Stamoulis et al. |
| 2010/0142482 A1 | 6/2010 | Lu et al. |
| 2010/0315950 A1 | 12/2010 | Venkataraman et al. |
| 2011/0039562 A1 | 2/2011 | Balasubramanian et al. |
| 2012/0149382 A1 | 6/2012 | Fox et al. |
| 2012/0322504 A1 | 12/2012 | Chou et al. |
| 2013/0130670 A1 | 5/2013 | Samdanis et al. |
| 2013/0310048 A1 * | 11/2013 | Hunukumbure .. H04W 52/0206 455/443 |
| 2015/0271729 A1 * | 9/2015 | Sirotkin ............. H04W 36/302 370/332 |
| 2017/0208499 A1 | 7/2017 | Ishii |
| 2023/0319671 A1 | 10/2023 | Catovic et al. |
| 2024/0056966 A1 * | 2/2024 | Zeng ................ H04W 52/0212 |

FOREIGN PATENT DOCUMENTS

| | | |
|---|---|---|
| EP | 2702809 A1 | 3/2014 |
| EP | 2676491 B1 | 8/2018 |
| EP | 3850884 A1 | 7/2021 |
| EP | 3141080 B1 | 9/2021 |
| EP | 4087326 B1 | 5/2023 |
| JP | 2013538495 A | 10/2013 |
| KR | 20120025609 A | 3/2012 |
| KR | 102679873 B1 | 7/2024 |
| WO | 2009097779 A1 | 8/2009 |
| WO | 2014020560 A1 | 2/2014 |
| WO | 2014047830 A1 | 4/2014 |
| WO | 2016053804 A1 | 4/2016 |
| WO | 2021173240 A1 | 9/2021 |
| WO | WO-2023146382 A1 * | 8/2023 |

* cited by examiner

REDUCING GREENHOUSE GAS EMISSIONS OF TERRESTRIAL WIRELESS TELECOMMUNICATIONS NETWORKS

BACKGROUND

By some estimates, the telecommunications industry is responsible for about 2-3% of annual global energy consumption. One of the highest contributors to the operating cost of a terrestrial wireless telecommunications network is the amount of energy consumed by network operations, which is estimated to range between 20% and 40%. Further, as networks increasingly densify by adding various types of base stations, the overall energy consumption of telecommunications networks is expected to increase, along with a corresponding increase in the networks' greenhouse gas emissions, unless steps are taken to mitigate such increases.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to devices, systems, and methods for reducing the energy consumed by a terrestrial wireless telecommunications network by opportunistically transferring subscriber traffic from the terrestrial wireless telecommunications network to a non-terrestrial network (NTN) such as a satellite network. When the disclosed technology is implemented in a terrestrial wireless telecommunications network, the system can determine current network resource utilization metrics each of the terrestrial wireless telecommunications network and the NTN. The system can predict a network resource utilization metric of at least one radio access network (RAN) cell of the terrestrial wireless telecommunications network during a future time period based on at least one of a plurality of factors. In some implementations, at least one of the plurality of factors can be a subscriber geolocation vector comprising at least one of a current location, a current speed of travel, or a current direction of travel of a subscriber of the terrestrial wireless telecommunications network. In some implementations, the system can predict that the network resource utilization of the at least one RAN cell is going to increase or decrease during a future time period because, for example, the subscriber is traveling, respectively, towards or away from the RAN cell. In some implementations, the at least one of the plurality of factors can be a subscriber traffic trend metric of the terrestrial wireless telecommunications network. The system can further predict a network resource utilization of the NTN during the future time period. When the network resource utilization metric of the terrestrial wireless telecommunications network is less than a first threshold and the network resource utilization of the NTN is less than a second threshold, the system can determine that sufficient network capacity exists in the NTN to offload at least one call or data session from the RAN cell to the NTN. In response to such a determination, the system can send an instruction to a wireless device served by the RAN cell to transfer a call or a data session to the NTN. Further, the system can cause the RAN cell to enter a low power or standby mode of operation, thereby reducing the energy consumed by the RAN cell and thus, overall, the terrestrial wireless telecommunications network.

As wireless telecommunications networks evolve to utilize higher spectrum bands, the coverage footprint of each RAN cell reduces, thereby requiring deployment of a higher number of RAN cells to cover a given area. An increasing number of connected devices and a higher demand for high-throughput, always-on connectivity for those devices further necessitates the need for denser wireless telecommunications networks that include a large number of RAN cells. As a result, the energy consumed by wireless telecommunications networks is significantly higher than in the past. The high amount of energy consumed by such densified modern wireless telecommunications networks results in excessive greenhouse gas emissions during normal operation of those networks. Every year, approximately 40 billion tons of $CO_2$ are emitted around the world. Conventional network operations can sometimes exacerbate the causes of climate change. For example, the average U.S. power plant expends approximately 600 grams of carbon dioxide for every kilowatt-hour generated. By some estimates, transferring one gigabyte of data can produce approximately three kilograms of $CO_2$. Each gigabyte of data downloaded thus results in approximately three kg of $CO_2$ emissions or other greenhouse gas emissions.

Thus, due to limited energy supply, high cost of energy, and climate change-related concerns, there remains a need for an operator of a wireless telecommunications network to reduce the energy consumed by the wireless telecommunications network wherever and whenever possible. This patent document discloses methodologies that can be used to reduce energy consumed by the wireless telecommunications network, thereby reducing the greenhouse gas emissions it is responsible for by offloading, i.e., transferring subscriber traffic from the terrestrial wireless telecommunications network to the NTN when the NTN has sufficient capacity to handle the transferred traffic. Since the non-terrestrial nodes, e.g., satellites, of the NTN are typically powered using solar energy and thus do not contribute to greenhouse gas emissions during their operation, offloading traffic from a terrestrial wireless telecommunications network to the NTN can result in an overall reduction in greenhouse gas emissions.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
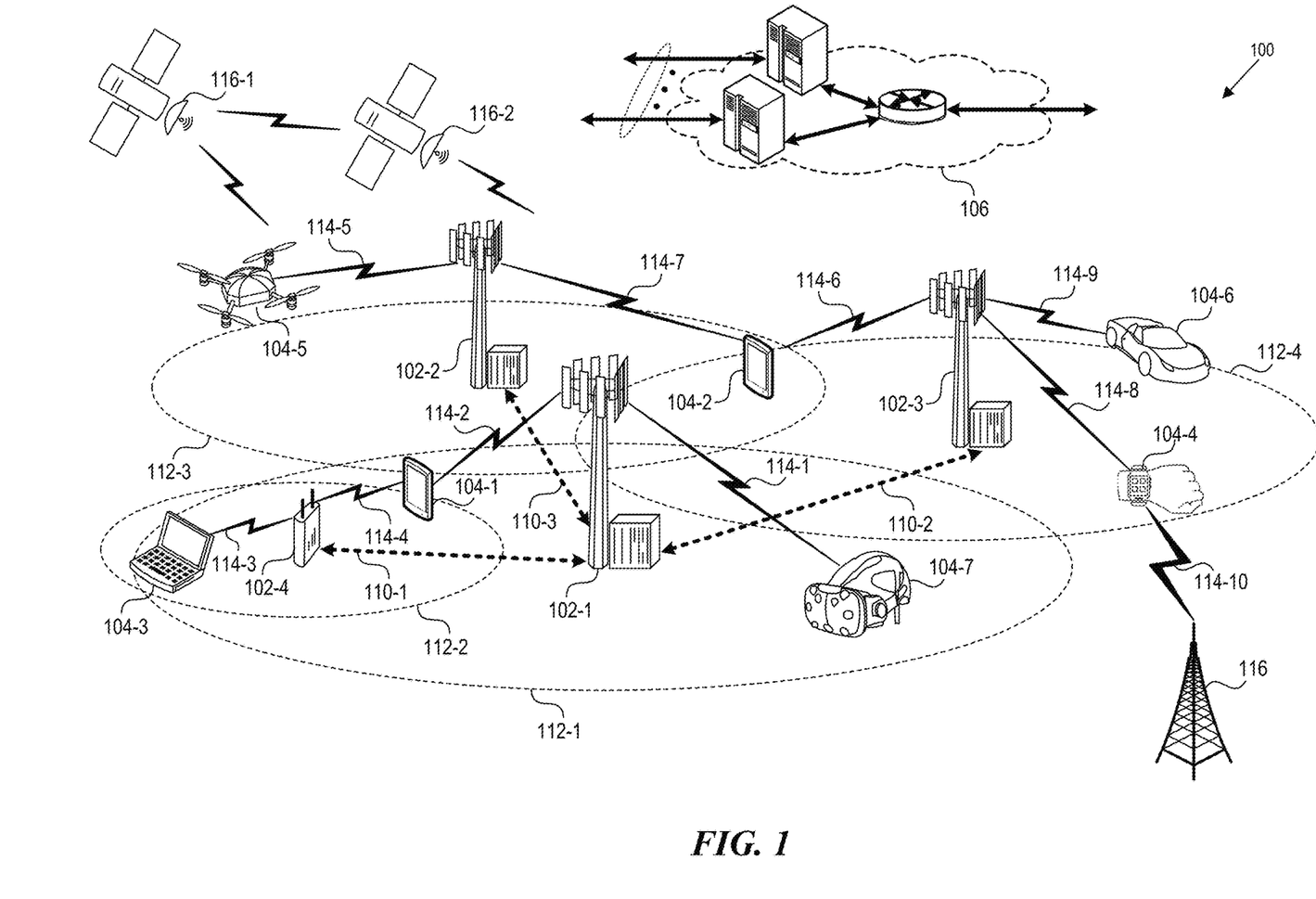
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. In some implementations, a 5G communication channel can use access frequencies of 24 GHz or more. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
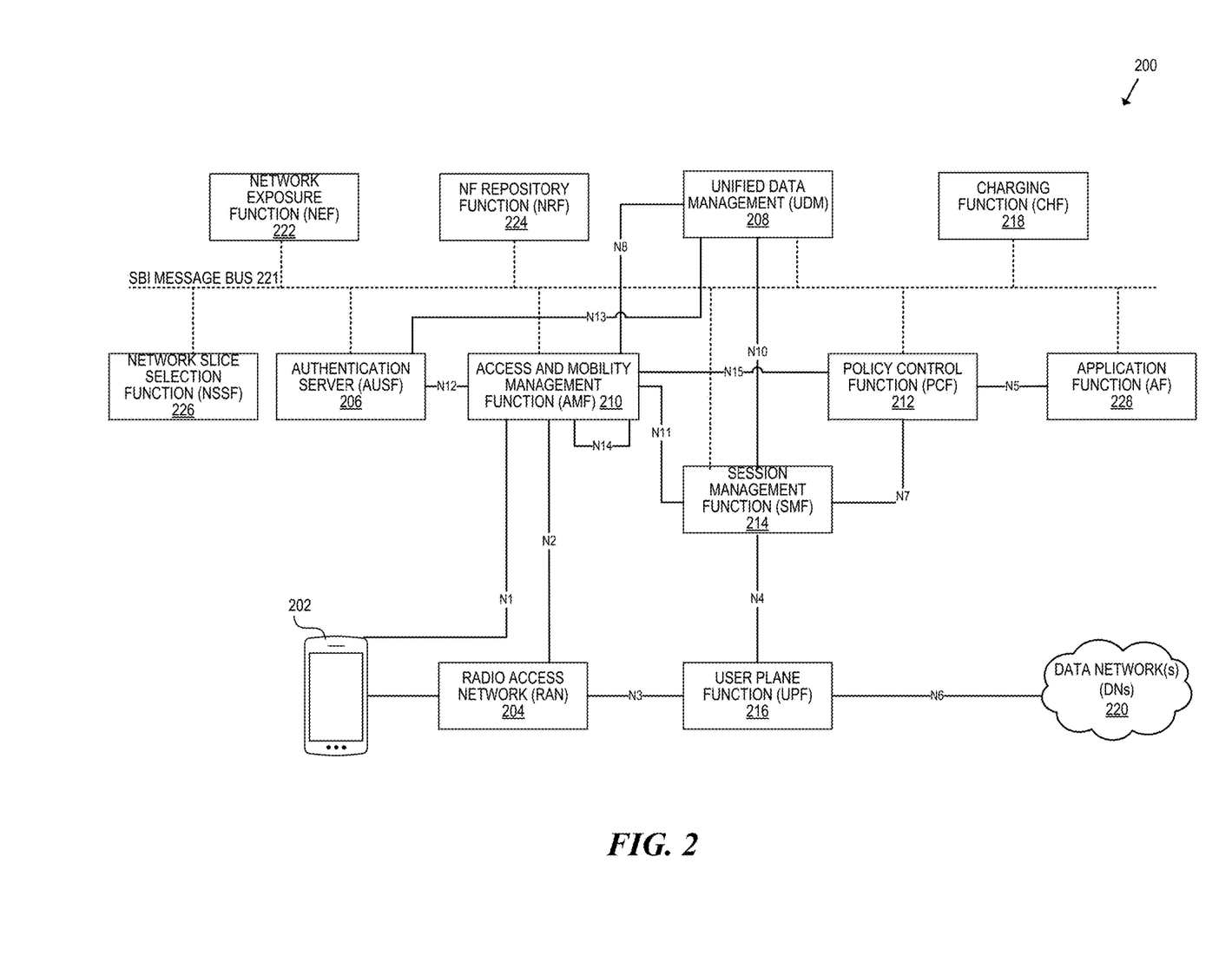
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFS include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
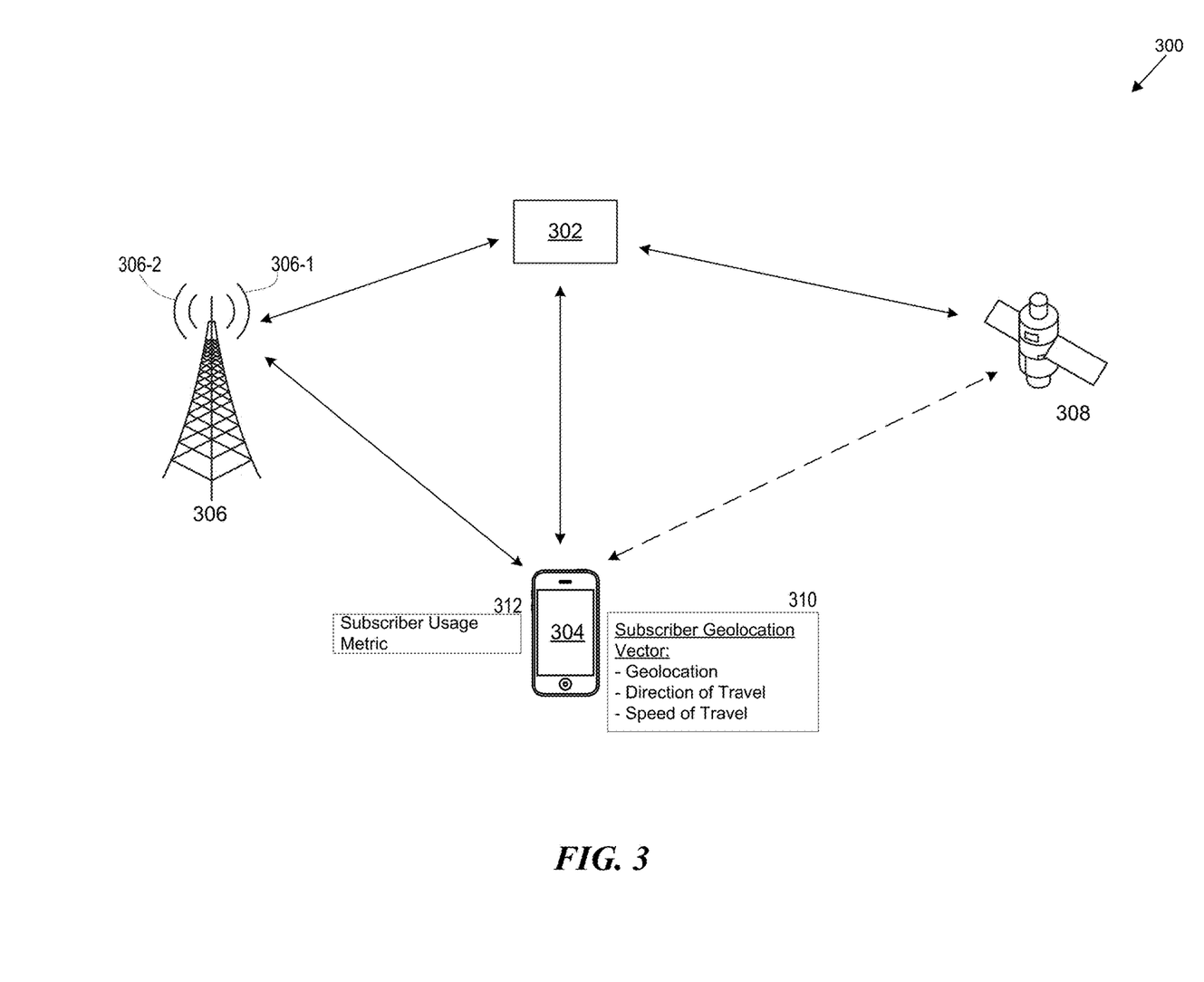
FIG. 3 is a block diagram that illustrates a system that can implement aspects of the disclosed technology.

Reducing Greenhouse Gas Emissions of Terrestrial Wireless Telecommunications Networks FIG. 3 is a block diagram that illustrates a system 300 that can implement some aspects of the disclosed technology. Some aspects of the system can be implemented in a terrestrial wireless telecommunications network (TWTN). Some aspects of the system can be implemented in a wireless device 304 that is configured to connect to the TWTN. The system can include at least one radio access network (RAN) node 306 of the TWTN. When the TWTN is a fourth-generation long-term evolution (4G LTE) network, the RAN node 306 can be an eNodeB. When the TWTN is a fifth generation (5G) network, the RAN node 306 can be a gNodeB. In some implementations, the RAN node 306 can comprise at least one RAN cell 306-1. In some implementations, the RAN node 306 can comprise a plurality of RAN cells 306-1, 306-2, and so on, each configured to provide wireless telecommunications service to a geographical area in the vicinity of the RAN node 306 using a spectrum of radio frequencies.

In some implementations, the wireless device 304 can be additionally configured to receive service from a non-terrestrial node of a non-terrestrial network (NTN) 308. The NTN 308 can be represented herein by a non-terrestrial node, for example, a satellite, of the NTN. All the operational components of the NTN 308 are not shown in FIG. 3; however, a person having ordinary skill in the art will recognize that NTN 308 comprises a plurality of network elements that are not shown here. In some implementations, the system can include a manager function 302 on which some aspects of the disclosed technology can be implemented. In some implementations, the manager function 302 can be implemented as a centralized function in a cloud computing environment. In some implementations, the manager function 302 can be implemented as a distributed function implemented at a plurality of locations across the TWTN. In some implementations, the manager function 302 can be implemented in a highly distributed multi-access edge compute cloud environment. The manager function 302 can be referred to herein as a power savings over non-terrestrial networks (PoSON) manager. In some implementations, implementation of the manager function 302 as described above can be further accompanied by an implementation of a corresponding PoSON subscriber agent function on the wireless device 304. In some implementations, RAN node 306 and its corresponding RAN cells 306-1 and 306-2, the NTN 308, the manager function 302, and the wireless device 304 can be configured to be aware of each other's functioning and interoperate with each other.

In some implementations, at least one non-terrestrial node of the NTN 308 can be solar-powered or otherwise configured to operate without emitting greenhouse gases such that transferring subscriber traffic from the TWTN to NTN 308 can result in a net reduction in greenhouse gas emissions when the same subscriber traffic, were it to be carried on the TWTN, would have resulted in non-zero greenhouse gas emissions. In some implementations, the TWTN and the NTN 308 each can be capable of providing similar performance and service to a subscriber without degradation of the subscriber's network experience on either of the networks.

In some implementations when the disclosed technology is implemented, the manager function 302 can be configured to receive or determine current network resource utilization metrics each of the TWTN and the NTN 308. In some implementations, the network resource utilization metric of the TWTN can be a network resource utilization metric of the RAN node 306. In some implementations, the network resource utilization metric of the TWTN can be a network resource utilization metric of the plurality of RAN cells 306-1 and 306-2. The manager function 302 can predict a network resource utilization metric of the RAN cell 306-1 during a future time period based on at least one of a plurality of factors 310-312. The plurality of factors 310-312 can be generated from a plurality of sources including a subscriber geolocation vector 310 based on a location, direction, or speed of movement of the wireless device 304, or a subscriber usage metric 312 of the wireless device 304. The manager function 302 can predict a network resource utilization metric of the NTN 308 during the future time period.

In some implementations, the manager function 302 can determine an available capacity metric of the NTN 308. In some implementations, when the predicted network resource utilization metric of the RAN cell 306-1 during the future time period is less than a first threshold and the available capacity metric of NTN 308 is greater than a second threshold, the manager function 302 can send an instruction to the wireless device 304 to transfer a call or a data session from the RAN cell 306-1 to the NTN 308. In some implementations, after the wireless device 304 has transferred at least one call or data session to NTN 308, the manager function 302 can further send an instruction to RAN node 306 or to RAN cell 306-1 to put RAN cell 306-1 into a low power consumption mode, a standby mode, or to turn off RAN cell 306-1, thereby reducing energy consumption—and hence greenhouse gas emissions—of the TWTN.

In some implementations, when the factor considered by the manager function 302 is a subscriber usage metric 312, the manager function 302 can predict a positive or negative change in subscriber traffic, and thus network energy consumption, in a future time period. When the change is negative, i.e., there is a decrease in subscriber traffic below the first threshold and the available capacity metric of NTN 308 is greater than the second threshold, the manager function 302 can send the instruction to the wireless device 304 to transfer a call or a data session from the RAN cell 306-1 to the NTN 308 and the instruction to RAN node 306 or RAN cell 306-1 to put the RAN cell 306-1 into the low power consumption mode or a standby mode at the start of the future time period. When the change is positive, i.e., there is an increase in subscriber traffic above the first threshold, the manager function 302 can send the instruction to RAN node 306 or RAN cell 306-1 to turn on or put RAN cell 306-1 into a normal operating mode of RAN cell 306-1 at the start of the future time period to accommodate the predicted increase in subscriber traffic.

In some implementations, when the factor considered by the manager function 302 is a subscriber geolocation vector 310 based on a direction or speed of movement of wireless device 304, the manager function 302 can predict a positive or negative change in subscriber traffic, and thus network energy consumption, in a future time period of RAN cell 306-1 based on an aggregate movement of subscriber devices, including wireless device 304, toward or away from RAN cell 306-1. When the change is negative, i.e., there is a decrease in subscriber traffic below the first threshold due to subscribers, including wireless device 304, moving away from RAN cell 306-1, the manager function 302 can send the instruction to wireless device 304 to transfer a call or a data session from RAN cell 306-1 to NTN 308 and further send an instruction to RAN node 306 or RAN cell 306-1 to put RAN cell 306-1 into a low power consumption mode or a standby mode at the start of the future time period. When the change is positive, i.e., there is an increase in subscriber traffic above the first threshold due to subscribers, including wireless device 304, moving toward RAN cell 306-1, the manager function 302 can send the instruction to RAN node 306 or RAN cell 306-1 to turn on or put RAN cell 306-1 into a normal operating mode of RAN cell 306-1 at the start of the future time period. In some implementations, the subscriber geolocation vector 310 can be determined by an operator of the TWTN using wireless device 302's geolocation information that is known to the operator through its operation of the TWTN. In some implementations, the subscriber geolocation vector 310 can be determined by the operator of the TWTN based on wireless device 304's geolocation information that is received by the operator from its business partners such as Google or Apple and may be derived from subscribers' use of mapping tools such as Google Maps. The aforementioned business partners and mapping tools are merely examples and are not to be construed to be limiting. A person having ordinary skill in the art will recognize that the operator of the wireless telecommunications network may obtain geolocation information about subscribers connected to its network from a variety of sources, business partners, or tools.

In some implementations when the manager function 302 is configured to receive or determine current network resource utilization metrics of the TWTN and the NTN and to determine the subscriber geolocation vector 310 or the subscriber usage metric 312 of the wireless device 304, the manager function 302 is in the best position to send an instruction to the wireless device 304 to transfer a call or a data session from RAN cell 306-1 to NTN 308 or to send an instruction to RAN node 306 or to RAN cell 306-1 to put RAN cell 306-1 into a low power consumption mode. This is so because in some implementations, the TWTN, the NTN 308, and the wireless device 304 may not have a global view of the system 300 and thus, for example, may not have knowledge of each other's metrics.

In some implementations, the wireless device 304 can, during a start-up sequence of the wireless device 304, i.e., when the wireless device 304 is powered on, communicate with the manager function 302 to receive a list of NTNs, for example NTN 308, that are configured to implement the disclosed technology. In some implementations, the RAN node 306 or the RAN cell 306-1 can be configured to report to the manager function 302 a location of a plurality of wireless devices, including wireless device 304, that are served by the RAN node 306 or the RAN cell 306-1 respectively. In some implementations, the wireless device 304 can be configured to report to the manager function 302 a success or failure of a transfer of a call or data session from the TWTN to the NTN 308. In some implementations, the manager function 302 can determine a success probability of transferring a call or a data session from the RAN cell 306-1 to NTN 308 and, when the success probability is less than a third threshold, prevent sending of an instruction to the wireless device 304 to transfer a call or a data session from the RAN cell 306-1 to NTN 308, and it can further prevent sending of an instruction to RAN node 306 or to RAN cell 306-1 to put RAN cell 306-1 into a low power consumption mode, a standby mode, or to turn off RAN cell 306-1.

Figure 4:
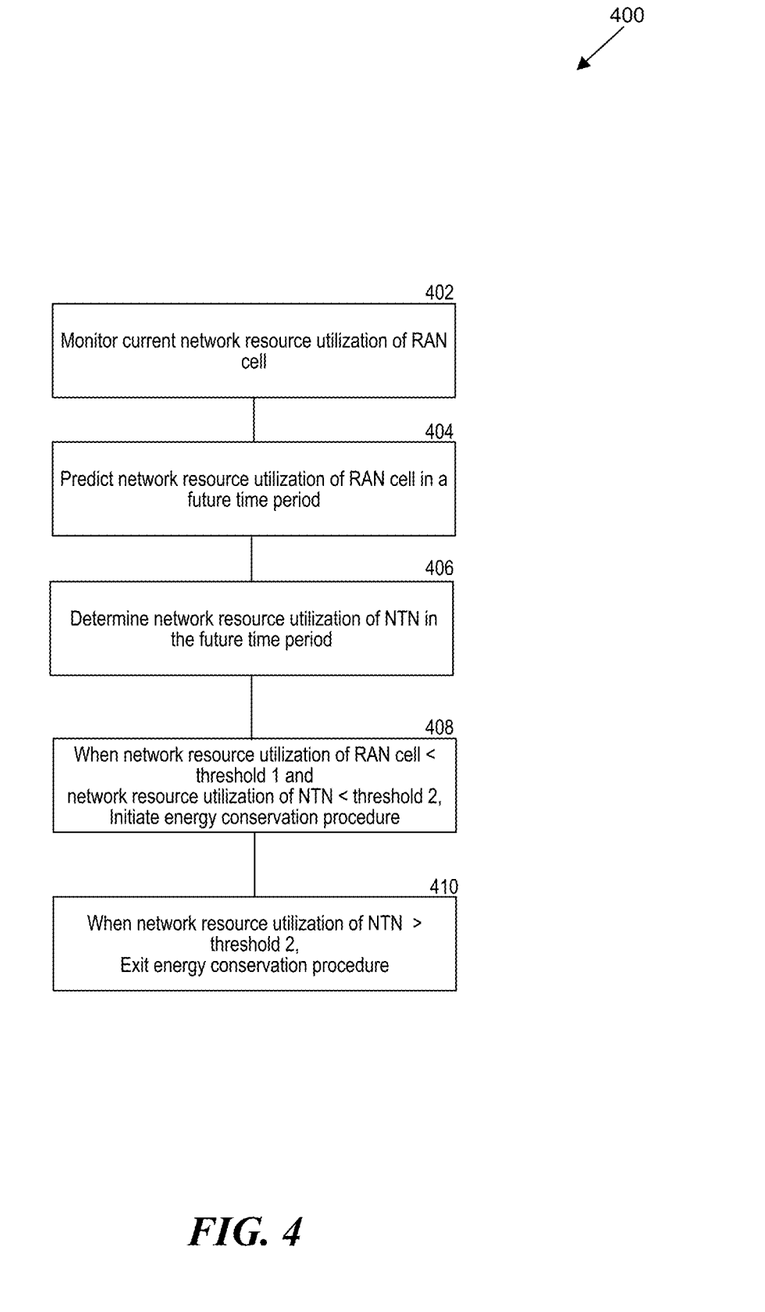
FIG. 4 is a flowchart of a process in which at least some aspects of the disclosed technology are implemented.

FIG. 4 is a flowchart of a process 400 in which at least some aspects of the disclosed technology are implemented. Some aspects of the process can be implemented in a system of a terrestrial wireless telecommunications network. At 402, the system can monitor a current network resource utilization metric of a radio access network (RAN) cell of a terrestrial wireless telecommunications network. At 404, the system can predict a network resource utilization metric of the RAN cell in a future time period based on at least one factor. In some implementations, the at least one factor can comprise determining a subscriber geolocation vector of at least one subscriber of the terrestrial wireless telecommunications network. In some implementations, the subscriber geolocation vector can be determined based on a current location, a current speed, and a current direction of travel of the subscriber. In some implementations, the at least one factor can comprise determining a subscriber usage metric of a subscriber of the terrestrial wireless telecommunications network. In some implementations, the subscriber usage metric can represent a volume of network traffic expected to be generated by the subscriber during the future time period. In some implementations, the at least one factor can comprise determining a success probability of transferring the first call or the first data session by the first wireless device from the RAN cell to the NTN. In some implementations, the success probability can be determined based on a success or failure of a second call or a second data session whose transfer was attempted by a second wireless device during a prior time period.

At 406, the system can determine a network resource utilization metric of a non-terrestrial network (NTN) in the future time period. At 408, the system can, in response to determining that the network resource utilization metric of the RAN cell is less than a first threshold and the network resource utilization metric of the NTN is less than a second threshold in the future time period, initiate an energy conservation procedure. In some implementations, initiating the energy conservation procedure can comprise sending an instruction to a first wireless device connected to the RAN cell to transfer a first call or a first data session from the RAN cell to the NTN, and further comprise sending an instruction to the RAN cell to enter a low power mode of operation. In some implementations, initiating the energy conservation procedure by the network device can comprise sending, by the network device, an instruction to the RAN cell to reject a third call or a third data session. In some implementations, initiating the energy conservation procedure can reduce greenhouse gas emissions compared to a normal mode of operation of the terrestrial wireless telecommunications network.

At 410, when the network resource utilization metric of the NTN is greater than the second threshold, the system can exit the energy conservation procedure. In some implementations, exiting the energy conservation procedure can comprise preventing sending of the instruction to the first wireless device to transfer the first call or the first data session from the RAN cell to the NTN and further comprise preventing sending of the instruction to the RAN cell to enter the low power mode of operation.

Computer System

Figure 5:
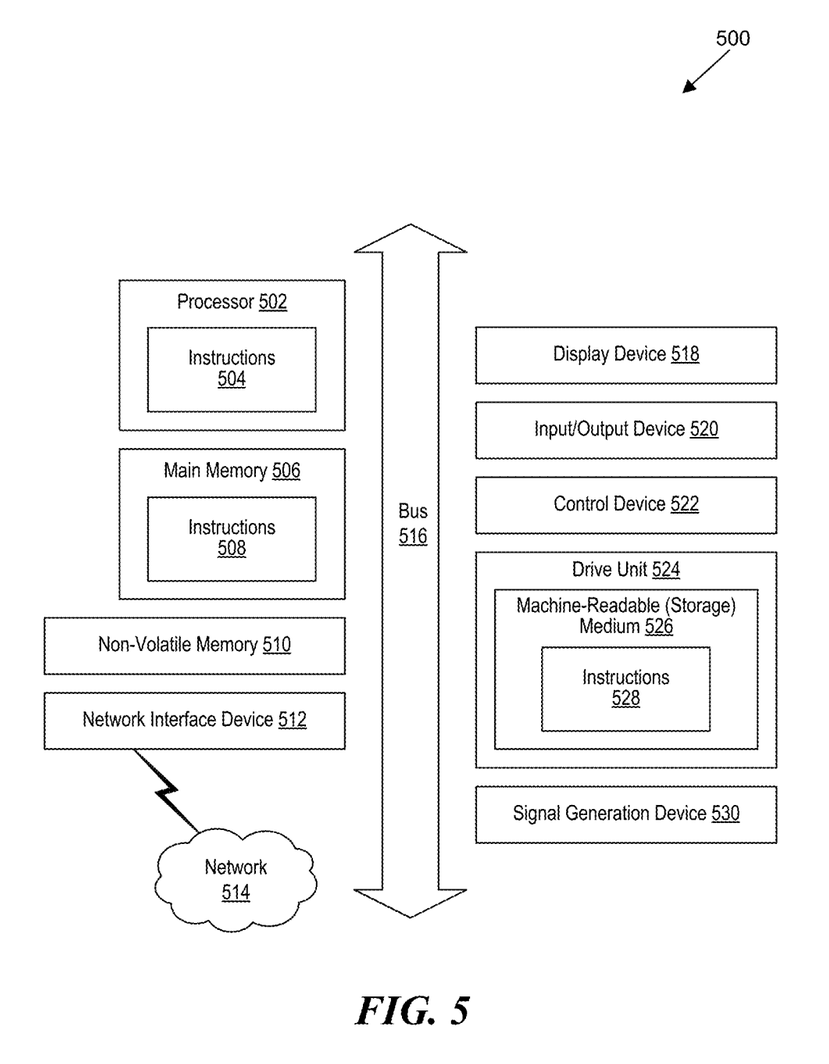
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms.

Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A device comprising:
   at least one hardware processor; and
   at least one non-transitory memory storing instructions, which, when executed by the at least one hardware processor, cause the device to:
   monitor a current network resource utilization metric of a radio access network (RAN) cell of a terrestrial wireless telecommunications network;
   predict a network resource utilization metric of the RAN cell in a future time period based on at least one factor,
      wherein the at least one factor comprises determining a success probability of transferring a first call or a first data session by a first wireless device from the RAN cell to a non-terrestrial network (NTN), and
      wherein the success probability is determined based on a success or failure of a second call or a second data session whose transfer was attempted by a second wireless device during a prior time period;
   determine a network resource utilization metric of the NTN in the future time period; and
   in response to determining that the network resource utilization metric of the RAN cell is less than a first threshold and the network resource utilization metric of the NTN is less than a second threshold in the future time period, initiate an energy conservation procedure,
      wherein initiating the energy conservation procedure comprises sending an instruction to the first wireless device connected to the RAN cell to transfer the first call or the first data session from the RAN cell to the NTN, and
      wherein initiating the energy conservation procedure further comprises sending an instruction to the RAN cell to enter a low power mode of operation.

2. The device of claim 1,
   wherein the at least one factor comprises determining a subscriber geolocation vector of at least one subscriber of the terrestrial wireless telecommunications network, and
   wherein the subscriber geolocation vector is determined based on a current location, a current speed, and a current direction of travel of the subscriber.

3. The device of claim 1,
   wherein the at least one factor comprises determining a subscriber usage metric of a subscriber of the terrestrial wireless telecommunications network, and
   wherein the subscriber usage metric represents a volume of network traffic expected to be generated by the subscriber during the future time period.

4. The device of claim 1 caused to:
when the network resource utilization metric of the NTN is greater than the second threshold, exit the energy conservation procedure,
wherein exiting the energy conservation procedure comprises preventing sending of the instruction to the first wireless device to transfer the first call or the first data session from the RAN cell to the NTN, and
wherein exiting the energy conservation procedure further comprises preventing sending of the instruction to the RAN cell to enter the low power mode of operation.

5. The device of claim 1,
wherein initiating the energy conservation procedure reduces greenhouse gas emissions compared to a normal mode of operation of the RAN cell.

6. A method for reducing greenhouse gas emissions of a terrestrial wireless telecommunications network comprising a radio access network (RAN) cell, the method comprising:
monitoring a current network resource utilization metric of the RAN cell;
predicting a network resource utilization metric of the RAN cell in a future time period based on at least one factor,
wherein the at least one factor comprises determining a success probability of transferring a first call or a first data session by a first wireless device from the RAN cell to a non-terrestrial network (NTN), and
wherein the success probability is determined based on a success or failure of a second call or a second data session whose transfer was attempted by a second wireless device during a prior time period;
determining a network resource utilization metric of the NTN in the future time period; and
in response to determining that the network resource utilization metric of the RAN cell is less than a first threshold and the network resource utilization metric of the NTN is less than a second threshold in the future time period, initiating an energy conservation procedure,
wherein initiating the energy conservation procedure comprises sending an instruction to the first wireless device connected to the RAN cell to transfer the first call or the first data session from the RAN cell to the NTN, and
wherein initiating the energy conservation procedure further comprises sending an instruction to the RAN cell to enter a low power mode of operation.

7. The method of claim 6 wherein the at least one factor comprises:
determining a subscriber geolocation vector of at least one subscriber of the terrestrial wireless telecommunications network,
wherein the subscriber geolocation vector is determined based on a current location, a current speed, and a current direction of travel of the subscriber.

8. The method of claim 6 wherein the at least one factor comprises:
determining a subscriber usage metric of a subscriber of the terrestrial wireless telecommunications network,
wherein the subscriber usage metric represents a volume of network traffic expected to be generated by the subscriber during the future time period.

9. The method of claim 6 further comprising:
when the network resource utilization metric of the NTN is greater than the second threshold, exiting the energy conservation procedure,
wherein exiting the energy conservation procedure comprises preventing sending of the instruction to the first wireless device to transfer the first call or the first data session from the RAN cell to the NTN, and
wherein exiting the energy conservation procedure further comprises preventing sending of the instruction to the RAN cell to enter the low power mode of operation.

10. The method of claim 6,
wherein initiating the energy conservation procedure reduces greenhouse gas emissions compared to a normal mode of operation of the RAN cell.

11. A system comprising:
at least one hardware processor; and
at least one non-transitory memory storing instructions, which, when executed by the at least one hardware processor, cause the system to:
monitor, by a network device of a terrestrial wireless telecommunications network comprising a radio access network (RAN) cell, a current network resource utilization metric of the RAN cell;
predict, by the network device, a network resource utilization metric of the RAN cell in a future time period based on at least one factor,
wherein the at least one factor comprises determining a success probability of transferring a first call or a first data session by a first wireless device from the RAN cell to a non-terrestrial network (NTN), and
wherein the success probability is determined based on a success or failure of a second call or a second data session whose transfer was attempted by a second wireless device during a prior time period;
determine, by the network device, a network resource utilization metric of the NTN in the future time period; and
in response to determining that the network resource utilization metric of the RAN cell is less than a first threshold and the network resource utilization metric of the NTN is less than a second threshold in the future time period, initiate, by the network device, an energy conservation procedure,
wherein initiating the energy conservation procedure comprises sending an instruction by the network device to the first wireless device connected to the RAN cell to transfer the first call or the first data session from the RAN cell to the NTN, and
wherein initiating the energy conservation procedure further comprises sending by the network device an instruction to the RAN cell to enter a low power mode of operation.

12. The system of claim 11,
wherein the at least one factor comprises determining, by the network device, a subscriber geolocation vector of at least one subscriber of the terrestrial wireless telecommunications network, and
wherein the subscriber geolocation vector is determined based on a current location, a current speed, and a current direction of travel of the subscriber.

13. The system of claim 11,
wherein the at least one factor comprises determining, by the network device, a subscriber usage metric of a subscriber of the terrestrial wireless telecommunications network, and
wherein the subscriber usage metric represents a volume of network traffic expected to be generated by the subscriber during the future time period.

14. The system of claim 11 further caused to:
when the network resource utilization metric of the NTN is greater than the second threshold, cause the network device to exit the energy conservation procedure,
  wherein exiting the energy conservation procedure comprises preventing sending of the instruction by the network device to the first wireless device to transfer the first call or the first data session from the RAN cell to the NTN, and
  wherein exiting the energy conservation procedure further comprises preventing sending of the instruction by the network device to the RAN cell to enter the low power mode of operation.

15. The system of claim 11,
wherein initiating the energy conservation procedure by the network device comprises sending, by the network device, an instruction to the RAN cell to reject a third call or a third data session.

16. The system of claim 11 caused to:
in response to the network device receiving a message from the wireless device, send to the wireless device an identifier of the NTN to which the wireless device can transfer the first call or the first data session.

17. The system of claim 11,
wherein initiating the energy conservation procedure by the network device reduces greenhouse gas emissions compared to a normal mode of operation of the RAN cell.

* * * * *